Nov. 14, 1933.   G. MANIERRE   1,934,939
ARTICULATED CHUTE
Filed July 6, 1931   2 Sheets-Sheet 1
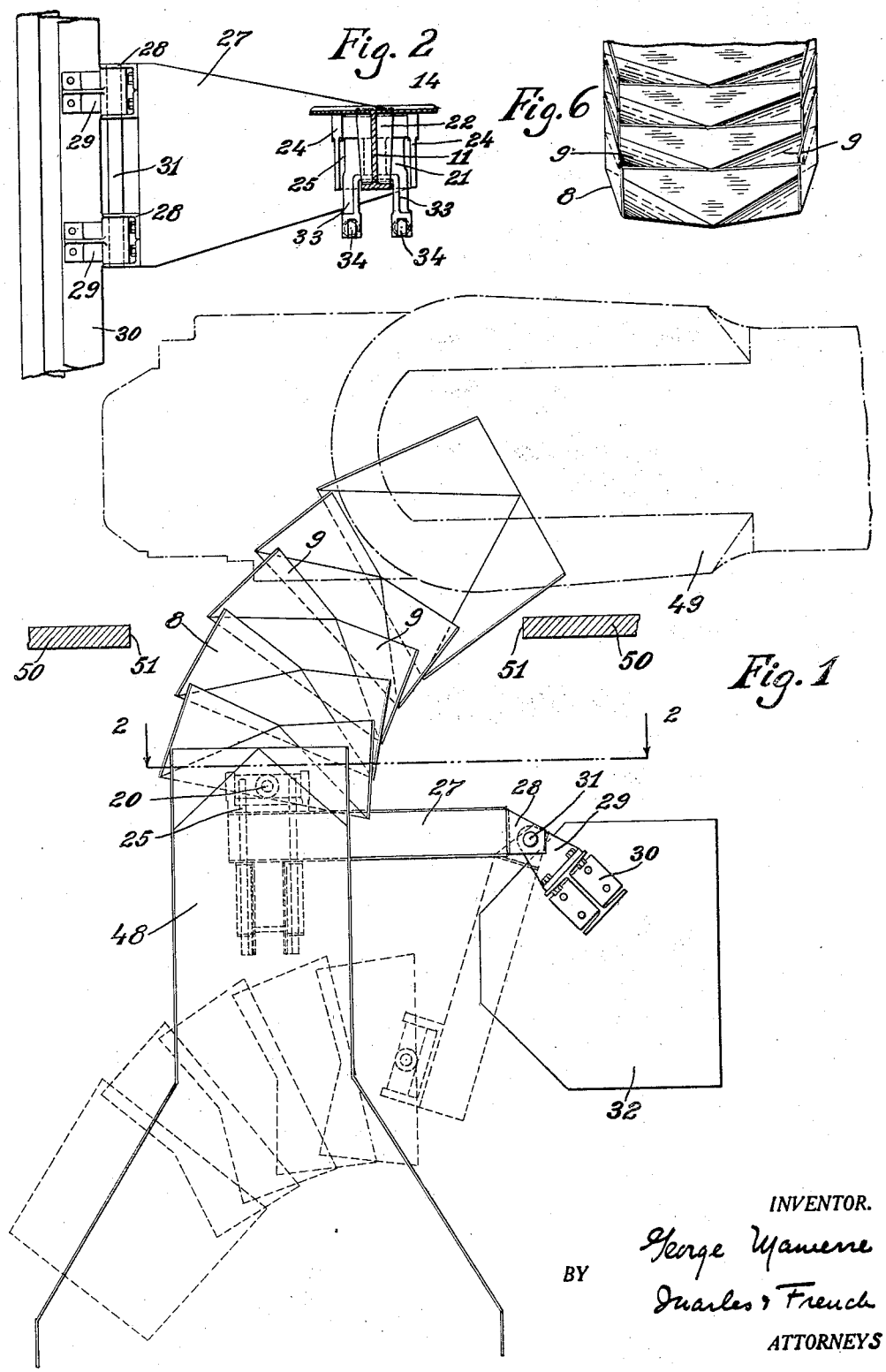
INVENTOR.
George Manierre
BY Charles & French
ATTORNEYS Nov. 14, 1933.  G. MANIERRE  1,934,939
ARTICULATED CHUTE
Filed July 6, 1931  2 Sheets-Sheet 2
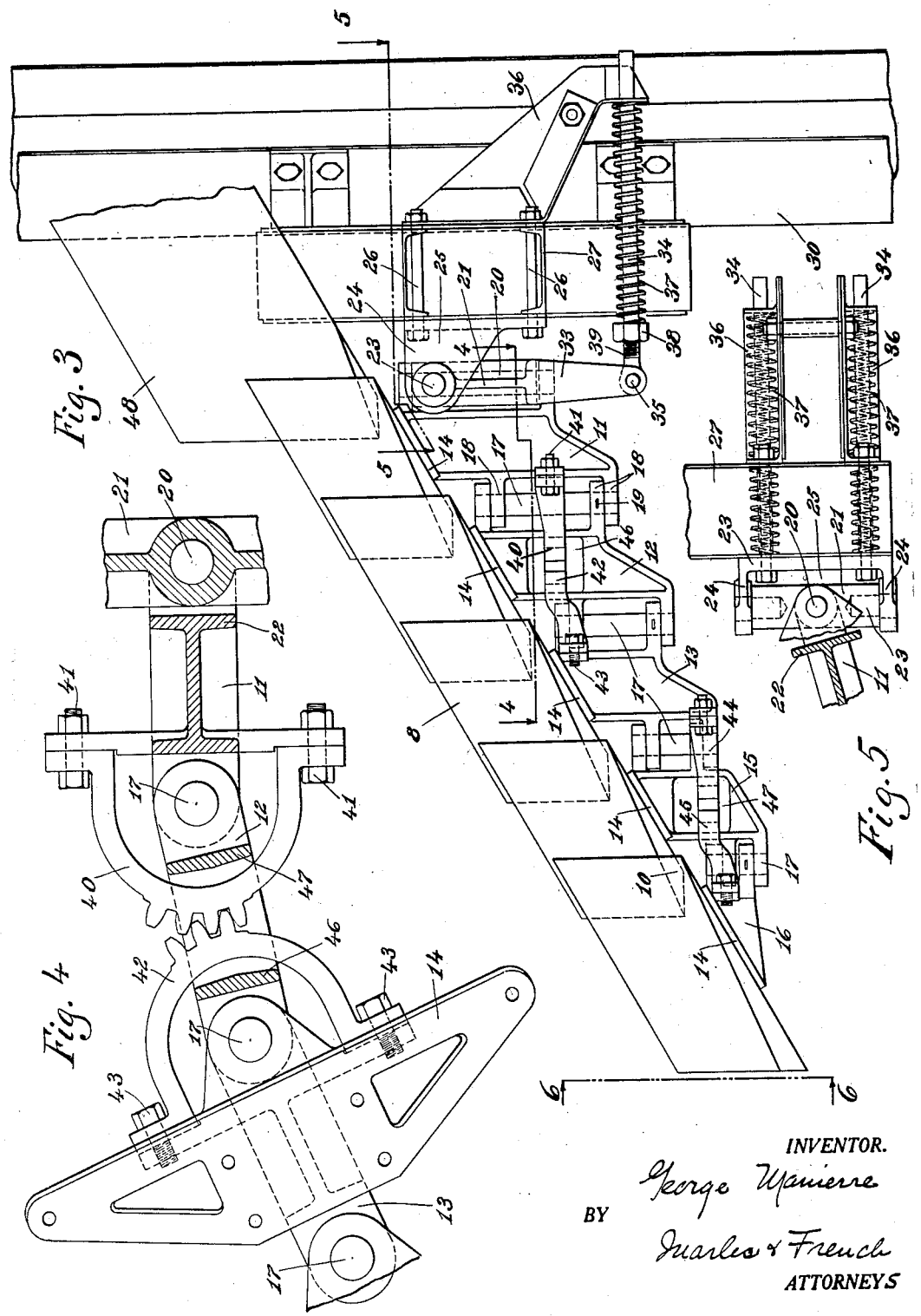
INVENTOR.
George Manierre
BY
Charles & French
ATTORNEYS Patented Nov. 14, 1933

1,934,939

UNITED STATES PATENT OFFICE 1,934,939

ARTICULATED CHUTE

George Manierre, Milwaukee, Wis.

Application July 6, 1931. Serial No. 548,778

7 Claims. (Cl. 193—25)

The invention relates to articulated chutes.

The general object of the invention is to provide an articulated chute in which the sections of the chute may be turned or moved relatively to each other so that the material may be delivered by gravity at an angle from its point of entrance into the chute, for example chutes of the type described herein are used for delivering bulk material such as coal upon a loader located in a box car, the chute being adapted to be projected through the door of the box car and turned so as to bring its delivery end in a position approximately lengthwise of the car to discharge into the hopper of a conveyor mechanism within the car and commonly called a loader. With chutes of this kind it is desirable to have each chute section move relative to the adjacent chute sections so that the angle that each chute section makes with the next section will be the same and it is one of the objects of this invention to provide a chute structure in which uniform angular movement is imparted to each chute section as the angularity of the whole chute structure is varied so that the material will move down along a uniformly curved path.

A further object of the invention is to connect the uniformly movable chute sections together in such a way as to dispose the bottom edge of these chute sections in a substantially horizontal plane regardless of their angular position.

A further object of the invention is to provide a simple and effective mechanism for counteracting the effect of the weight of the material in the chute upon the chute supporting structure and to permit varying the vertical angularity of the chute structure.

The invention further consists in the several features hereinafter set forth and more particularly defined by claims at the conclusion hereof:

In the drawings, Fig. 1 is a plan view of the chute structure;

Fig. 2 is a detail sectional view taken on the line 2—2 of Fig. 1;

Fig. 3 is a side elevation view of the chute;

Fig. 4 is a detail sectional view taken on the line 4—4 of Fig. 3;

Fig. 5 is a detail sectional view taken on the line 5—5 of Fig. 3.

Fig. 6 is a detail front end view of the chute.

The chute structure embodying the invention includes a plurality of chute sections 8, means for connecting said sections together for uniform movement, and means for supporting the chute.

Each of the chute sections 8 is formed of channel shaped members and these sections are arranged to successively overlap one another in the direction of flow of the material and to prevent interference between sections when they are turned, all of the sections but the last have their lower part formed to provide angular portions 9 that are bent upwardly as indicated at 10 in Fig. 3.

Brackets or supports 11, 12 and 13 are each provided with foot or pad portions 14 connected respectively to the bottom of the first three chute sections and brackets 15 and 16 are similarly respectively connected with the other two chute sections and adjacent brackets are pivotally connected together in each instance by a vertically disposed pivot pin 17 that passes through the spaced arms 18 of each set of brackets, said pin being retained in operating position in any suitable manner as by a pin 19 passing transversely through one of the arms 18 and the pin 17. Thus the brackets connected together and each to a chute section form an articulated chute structure in which because of the vertical disposition of the pivot pins the brackets turn in horizontal planes and consequently the bottoms of the chute sections will be maintained respectively in the same general horizontal plane regardless of the angular position of the chute sections relative to each other. It will also be noted that the arms 18 for the next lower chute section rest upon the arms of the upper section so that the load is carried by the brackets and transmitted through them back to the first bracket 11.

Referring to Figs. 3, 4 and 5 the first bracket 11 is mounted to turn in a horizontal plane on a pin 20 and this pin is in turn mounted in a horizontally disposed pivot member 21 so that the whole chute structure can be moved in a vertical plane about the pivot mountings of the member 21 as an axis. Also the bracket 11 is provided with a stop pad portion 22 which is adapted to engage with portions of the pivot member 21 to limit the angle through which the first chute section can swing in a horizontal plane.

The pivot member 21 is provided with sockets to receive the horizontally disposed pivot members 23 which are mounted in arms 24 of a channel member 25 secured by bolts 26 to the outer end of a swinging arm 27 whose inner end is provided with spaced supporting and pivot bearings 28 cooperating with similar bearings 29 mounted on or secured to a column or upright 30, a vertically disposed pivot shaft 31 passing through said bearings 28 and 29 and operatively connecting the arm 27 to the upright 30 which is mounted in a suitable foundation member as the concrete slab 32. Thus the chute structure being supported upon the swinging arm 27 has a greater range of operation than if the pivot member 21 were directly mounted in a fixed support though it will be understood that this may be done if desired. However, with the mounting of the chute structure on the swinging arm 27 the whole chute structure may be swung outwardly to the full line position shown in Fig. 1 in which position it may project out over a right of way, as a railroad track, or it may be swung back to the dotted line position shown in this view entirely out of the way.

In order to counteract or counter-balance the weight of the material being delivered through the chute and to permit changing the vertical inclination of the chute the pivot member 21 is provided with a pair of depending spaced arms 33, each having forked ends in which the eyed end of a rod 34 is mounted and connected by a pin 35, the other end of said rod being slidably mounted in the outer end of structural steel bracket arm 36 which is connected to the arm 27 by the bolts 26. A spring 37 is mounted on each rod 34 between the arm 36 and a nut 38 adjustably mounted on the threaded portion 39 of said rod so that the weight of the chute and its contents is counteracted by the springs 37 which are subjected to compression through the resolution of this weight through the arms 33 into forces acting along the rods 34 against the pressure of said springs which by the adjustment of the nuts 38 may have their compressive action varied so that the chute structure may thus be given different positions of vertical inclination to suit different working conditions.

In order to impart a uniform angular movement to the chute sections, so that on the movement of any one of them from a straight line position a corresponding angular movement will be imparted to each of the other chute sections, means have been provided to connect the supporting brackets of the chute sections together through gearing connections so that a positive angular movement is transmitted from one bracket to another. For this purpose a gear segment 40 is connected by bolts 41 to the bracket 11 and its teeth have rolling meshing engagement with a similar segment 42 secured by bolts 43 to the bracket 13 and similar intermeshing gear segments 44 and 45 are respectively connected to the front of bracket 13 and the rear portion of bracket 16. The intermediate brackets as the brackets 12 and 15 have vertically disposed webs having openings 46 and 47 therein through which the gear segments extend which segments mesh at the centers of these intermediate brackets 12 and 15 and have as their centers the pivot pins 17.

If now the lower chute section is turned at an angle this turning movement is transmitted through the gears 44 and 45 to cause a similar turning movement of the brackets 15 and 13 and the bracket 13 on turning will through the gears 42 and 40 produce a similar angular movement of the brackets 12 and 11 relative to each other. Thus each set of gearing connections acts to control the turning movement of three brackets of the whole series and by this the whole chute is turned with each section turning through the same angle as the next, it being noted that the angular displacement of those brackets carrying the gears acts to carry the pivot pins 17 for the brackets, such as 15 and 12, that do not have the gears, with them and in this way move these brackets also through the same angles.

The chute structure embodying the invention may be used for conveying material in many different ways and in Fig. 1 I have shown one of its applications wherein the chute structure is arranged to receive material from a supply chute 48 and to deliver it to a loader mechanism 49, such as a box car loader, positioned within a box car 50, parts of which including the door 51 have been indicated, the articulated construction of the chute permitting its delivery end to be projected through the door and turned to one side over the hopper of the loader 49 so that the coal or other material is carried down and along the curved path provided by the chute through the doorway of the car and to the loader which may be moved about the car as the loading proceeds, the chute being also movable to accommodate the changes in position of the loader.

I desire it to be understood that this invention is not to be limited to any particular form or arrangement of parts except in so far as such limitations are included in the claims.

What I claim as my invention is:

1. In a chute, the combination of a plurality of chute sections, means for connecting said chute sections together to form an articulated chute, and gearing connections between certain of the chute sections to impart uniform angular movement to said chute sections on the angular movement of any one section.

2. In a chute, the combination of a plurality of chute sections, a supporting bracket for each section, pivotal connections between adjoining brackets, intermeshing segmental gear sections between every three of the supporting brackets, said gear segments being mounted on the two outer brackets and meshing over the center of the intermediate bracket of the three brackets.

3. In a chute, the combination of an articulated chute, means for pivotally supporting said chute adjacent one end for movement in horizontal and vertical planes respectively, including a pivot member having depending arms, a support for said pivot member, rods carried by said arms and slidably mounted in a part of said support, adjustable stops on said rods, and springs mounted on said rods between said stops and said support.

4. In a chute, the combination of a plurality of chute sections, means for connecting said chute sections together to form an articulated chute, a support, an arm mounted to swing on said support, means for supporting said chute from the outer end of said arm for lateral and vertical pivotal movements relative to said arm, and means for controlling the anguluar movement of said chute sections relative to each other on the movement of one of said sections.

5. In a chute, the combination of a plurality of chute sections, means for connecting said chute sections together to form an articulated chute, a support, an arm mounted to swing on said support, means for supporting said chute from the outer end of said arm for lateral and vertical pivotal movements relative to said arm, spring means between said chute and arm opposing the vertical movement of said chute, and means for controlling the angular movement of said chute sections relative to each other on the movement of one of said sections.

6. In a chute, the combination of a plurality of chute sections, means for connecting said chute sections together to form an articulated chute including a supporting bracket for each chute section and vertically disposed pivots connecting said brackets together, and operating connections between certain of the brackets and extending between said pivots for imparting uniform angular movements to the chute sections relative to adjacent sections through and by the angular movement of one of said sections.

7. In a chute, the combination of a plurality of chute sections, a supporting bracket for each section, pivotal connection between adjoining brackets, means forming a connection between every three of the supporting brackets and having a rolling engagement over the center of the intermediate of the three brackets.

GEORGE MANIERRE.